United States Patent
Thebis

[15] 3,683,697
[45] Aug. 15, 1972

[54] TEMPERATURE COMPENSATED GRAVIMETER

[72] Inventor: Eberhard Thebis, Hochbergweg 25, 1 Berlin 45, Germany

[22] Filed: Sept. 12, 1969

[21] Appl. No.: 857,353

[30] Foreign Application Priority Data

Oct. 16, 1968 Germany..........P 18 04 204.1

[52] U.S. Cl....................................73/382, 73/497
[51] Int. Cl. ..............................................G01v 7/16
[58] Field of Search........73/382, 497, 516, 517, 493; 177/212; 318/634, 676, 651; 317/131

[56] References Cited

UNITED STATES PATENTS

| | | |
|---|---|---|
| 2,258,613 | 10/1941 | Kannenstine et al. ........73/382 |
| 2,869,851 | 1/1959 | Sedgfield et al..........73/517 R |
| 2,988,673 | 6/1961 | Harkins.................73/497 UX |
| 3,413,854 | 12/1968 | Graf............................73/382 |
| 2,593,339 | 4/1952 | Ostermann et al.....318/676 X |

*Primary Examiner*—James J. Gill
*Attorney*—Curt M. Avery, Arthur E. Wilfond, Herbert L. Lerner and Daniel J. Tick

[57] ABSTRACT

In a gravimeter, the gravity-responsive mass-and-spring system which responds to changes in gravity exhibits a dependence of its response upon changes in temperature. For compensating such temperature dependence, an electrically controllable force transmitter, preferably of the electromagnetic type, is connected with the mass of the gravimeter system to impose a corrective force thereupon. The force transmitter is controlled by an electric device which comprises temperature sensor means mounted in the housing which accommodates the gravimeter system. The sensor means operate to vary the corrective force in the sense required for minimizing or obviating the temperature dependence of the response characteristic.

5 Claims, 2 Drawing Figures

Patented Aug. 15, 1972　　3,683,697

Inventor:
Eberhard Thebis

TEMPERATURE COMPENSATED GRAVIMETER

My invention relates to gravimeters of the type having a mass-and-spring gravimeter system movably mounted in a housing to be deflected from a normal position by changes in gravity. Such gravimeters are equipped with a device for indicating the changes in gravity to which the system is subjected, the indication usually being in the form of a record on a chart or tape.

As a rule, the mass-and-spring system of such gravimeters exhibits a dependence of the response characteristic upon changes in temperature within the housing accommodating the gravimeter system. It has become known to compensate the temperature-dependent elastic characteristic of the gravimeter springs by mounting the gravimeter mass on several springs made of different materials so as to have respectively different moduli of elasticity whose temperature-responsive variations, in totality, compensate one another. Such complex systems are extremely difficult to mechanically tune with respect to the individual springs, requiring a great amount of labor, skill and time for producing and calibrating the equipment.

Among those just mentioned are systems in which a deflection of the spring system from a null position is measured by displacing the tap of a potentiometer in a circuit which operates to measure and electrically represents the position of the gravimeter system relative to its housing. With such systems it is known to provide for a temperature-responsive correction of the performance controlled by the displaceable potentiometer tap. This correction acts upon the movement of the tap member so as to be superimposed upon the measuring movement proper of the spring system with the result of compensating the thermal influence at the spring system. Equipment of this type also suffers from an excessive complexity due to the fact that tap components must be mechanically mounted or journalled on supporting structures made of materials which have different thermal coefficients of expansion and whose geometric dimensions must be precisely adapted to obtaining the desired compensation.

The above-mentioned various types of temperature-compensated gravimeters further have in common the disadvantage that due to the difference in heat capacity and heat conductivity of the materials and masses participating in the compensating performance, a dynamic compensation of the temperature characteristic exhibited by the elastic spring system can be achieved only with difficulty so that, for example, when preparing a gravimeter for operation, the gravimeter thermostat must be put into operation several hours before beginning the measuring operation of the instrument.

It is an object of my invention to provide temperature-compensated gravimeters, generally of the type initially mentioned herein, that avoid the shortcomings of the compensated equipment heretofore available.

A more specific object of my invention is to devise a gravimeter in which the temperature dependence of the response characteristic is compensated by relatively simple means requiring a greatly minimized amount of calibrating work and skill than heretofore needed and affording a more reliable performance without the need for excessively long preheating periods prior to commencing the reading or recording operation proper.

According to my invention, the mass-and-spring gravimeter system in a gravimeter generally of the type mentioned, is connected with an electrically operated force transmitter, such as an electromagnetic or electrostatic device, whose electrically controlled force is varied in dependence upon temperature with the aid of an electrical control device whose temperature sensor means are mounted in the housing wherein the gravimeter system is accommodated, the control being in the sense required for counteracting and substantially obviating the effect of changes in temperature upon the performance of the gravimeter system.

In gravimeter apparatus according to the invention, the temperature-dependent elastic characteristic of the mass-and-spring system, caused inter alia by thermally responsive changes in geometry and such properties of the material as affect the modulus of elasticity of the system springs, are compensated by the corrective force imposed upon the gravimeter system by the force transmitter in response to the temperature-responsive control, the operational or transfer function of the control means between the temperature sensor and the electromagnet or other force-field producing device being chosen in accordance with the particular properties of the sensor used and the amount of compensation needed.

Preferably used as temperature sensors in gravimeters according to the invention are electrical solid-state resistors of temperature-dependent resistivity and slight heat capacity. Particularly well suitable are resistors made of metals, for example copper, whose resistance-temperature coefficient is largely constant.

The invention will be further described with reference to an embodiment of a gravimeter according to the invention illustrated by way of example on the accompanying drawing in which.

Figure 1:
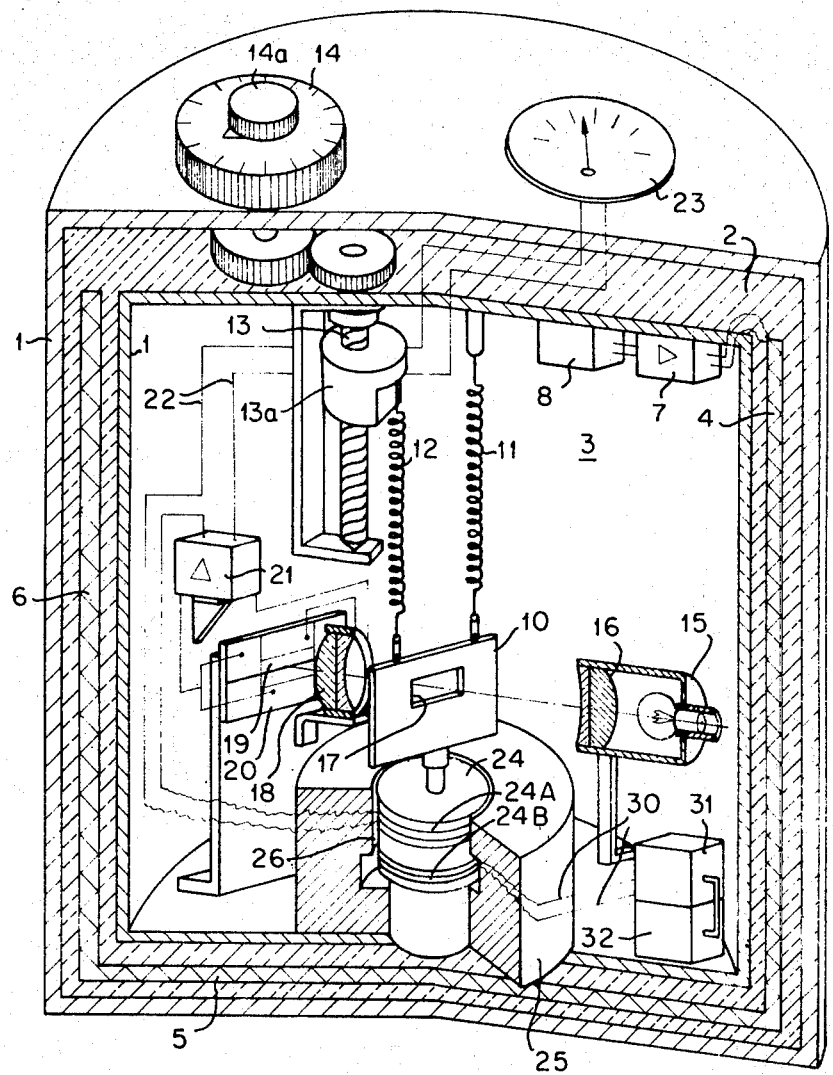
FIG. 1 is a schematic and sectional view of a gravimeter.

The apparatus shown in FIG. 1 comprises a housing 1 whose inner surface is lined by a layer of heat insulation 2 and in whose interior space 3 the gravimeter system proper is accommodated. Heater windings 4, 5 and 6 are embedded in the insulating layer 2 and are electrically heatable under control by a thermostat device 7 which is controlled by a temperature sensor 8 to regulate the heating power supplied to the heater windings 4, 5 and 6 so as to maintain an approximately constant temperature in the interior 3 of the housing 1.

The gravimeter system proper comprises a mass structure 10 in the shape of a plate suspended from a helical spring 11 and also connected to an auxiliary spring 12. The main spring 11 carries the major portion of the mass 10. The auxiliary spring 12 has its upper end attached to a displaceably guided nut 13a in threaded engagement with a measuring spindle 13 whose angular position is indicated on a scale 14. A knob 14a is coaxially rotatable in front of the scale 14 and is geared to the spindle 13 for calibrating the gravimeter system by accurately setting the mass 10 to its null position.

An illuminating device 15, passing a beam of light through an optical lens system 16, normally supplies homogeneous illumination through a diaphragm opening 17. The opening is imaged by an optical lens system 18 onto an image plane in which two matched photocells 19 and 20 are arranged side by side and separated by a narrow gap. In the null position of the mass 10, the image of opening 17 equally illuminates the two photocells which are connected in series opposition in an electrical measuring circuit so that the respective photoelectric voltages of the two cells just balance each other. When the mass 10 is displaced in the direction of the longitudinal axes of springs 11 and 12, i.e. in the vertical direction in FIG. 1, the image of opening 17 at the gap between the two photocells will also shift so that the photocells receive different amounts of illumination.

The resulting difference voltage at the output of the measuring circuit controls an amplifying device 21 which feeds an indicating circuit 22 with a corresponding direct current. A direct-current measuring instrument 23 and a coil 24A are series-connected in the indicating circuit, the winding 24A being mounted on a coil carrier 24 fastened to the mass plate 10 so that the carrier 24 and the coil form part of the gravimeter mass. Any gravity responsive deflection of the mass from its null position is indicated by the instrument 23. The winding 24A is coaxially located in the air gap of a cup-type permanent magnet 25 and forms together therewith an electromagnetic device which is controlled by the output current of the amplifier device 21 to impose upon the gravimeter mass a force in the direction toward the null position, thus tending to hold the gravimeter system in the null position. Preferably the amplifier device 21 is so designed that the current in circuit 22 is variable with the time integral of the output voltage of the measuring circuit which comprises the photocells 19 and 20.

The carrier 24 is provided with a second coil 24B, likewise arranged in the air gap of the magnet 25. Coil 24B is energized by direct current from a control device 31 which is monitored by an appertaining temperature sensor 32 so as to vary the current in line 30 in response to temperature variations in the interior 3 of the housing and consequently in the vicinity of the springs 11 and 12. This temperature-responsive current variation is such that any change in elasticity or other thermal effects do not cause a displacement of the mass 10 since the change in force due to thermal effect is compensated by a corresponding change of the counteracting magnetic force.

Figure 2:
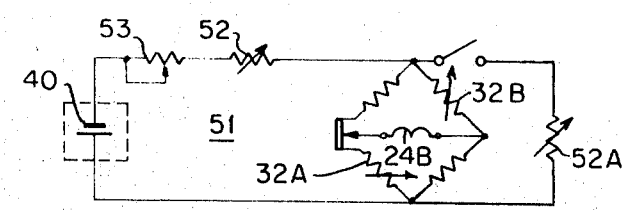
FIG. 2 is a schematic diagram of the temperature-compensating circuit of the same gravimeter.

For this purpose the control device, as shown in FIG. 2, is provided with a stabilized voltage source 40 which energizes a bridge network 51. Two opposite branches of the network comprise respective copper resistors 32A and 32B to serve as temperature sensors. The remaining two branches of the bridge network contain respective temperature-independent resistors. The output diagonal of the network is connected to the magnet coil 24B. For adapting the error voltage, supplied across the input diagonal of the bridge network 51, to the temperature characteristic of the gravimeter system 10, 11 and 12, the constant-voltage source 40 is connected to the input diagonal through a thermistor (NTC-resistor) 52 and an adjustable rheostat 53. It will be understood that the input voltage of the bridge network may also be adjusted or calibrated by connecting the control and regulating resistors 53, 52 in parallel relation to the source 40 so that the input diagonal of the bridge network receives its voltage from a voltage divider. Also for the purpose of such calibration, a heat-responsive resistor (thermistor or NTC-resistor) 52A may be connected in parallel relation to the input diagonal of the bridge, or the illustrated series and parallel resistors may conjointly be used for adjusting and calibrating purposes.

The direct current flowing through the measuring circuit 22 and indicated by instrument 23 remains independent of the temperature-dependent response of the spring system 10, 11, 12; and any temperature-dependent variation in the controlling force of the electromagnet system 24, 25 may additionally be taken into account by a corresponding control characteristic and/or calibration of the control device 31. Such calibration is performed under constant gravity conditions by varying the internal temperature of the housing 1 and then adapting the current flowing through the line 30 by correspondingly selecting or setting the bridge resistors, shifting the tap of the rheostat 53, and selecting the resistor 52 and/or the parallel resistor 52A.

The invention is applicable regardless of whether the gravimeter operates on the compensation (null) principle or on the deflection principle, and is not limited to the above-exemplified means for controlling the compensating magnetic force. As mentioned, the compensation may also be effected by an electrostatic force-producing device, such as a capacitor having a fixed plate opposite a movable plate, attached to the gravimeter mass for electrostatic attraction or repulsion in accordance with the applied variable voltage.

The above-mentioned magnet 25 preferably is a permanent magnet and the appertaining armature, which forms part of the gravimeter mass, is preferably ferromagnetic so that the magnetic force device also performs a damping action corresponding in principle to gravimeters of the type known, for example, from U.S. Pat. No. 3,413,854.

To those skilled in the art, it will be obvious from a study of this disclosure that such and other modifications are readily applicable without departing from the essential features of my invention.

I claim:

1. A gravimeter having a housing, a mass-and-spring gravimeter system mounted in said housing and having a temperature-dependent characteristic of response to changes in gravity, indicating means responsive to displacement of the mass of said mass-and-spring system for indication of forces acting upon said system, in combination with an electrically controllable force transmitter for imposing corrective force upon said gravimeter system, an electric control device connected to said force transmitter and having temperature-responsive sensor means in said housing for controlling said corrective force to compensate for said temperature dependence of said response characteristic, said force transmitter comprising electrically controllable field means having an electric circuit for excitation of a force field, and the mass of said system having a part located in the field of said field means for causing said corrective force to act between said part and said field means, said field means comprising a permanent magnet fixedly mounted in said housing, said part of said mass including a coil carrier movable in the field of said magnet and joined with said gravimeter mass, said electric circuit comprising a coil mounted on said carrier in said field, and a coil circuit connecting said coil to said control device, said force transmitter comprising a second coil mounted on said carrier in the field of said magnet, electric control means having sensor means responsive to deflection of said mass and being connected to said second coil and to said indicating means for energizing said second coil to magnetically balance gravitational deflection of said system.

2. In a gravimeter according to claim 1, said control device comprising a bridge network having resistive bridge branches, said sensor means comprising two temperature-responsive resistors connected in two opposite ones of said bridge branches, said coil circuit being connected to the output diagonal of said bridge network, and a source of adjustable constant voltage connected to the bridge input diagonal.

3. In a gravimeter according to claim 2, said control device comprising further temperature-responsive resistance means connected with said input diagonal for varying the bridge input voltage in dependence upon temperature changes.

4. In a gravimeter according to claim 3, said further temperature-responsive resistance means being connected in series with said voltage source.

5. In a gravimeter according to claim 3, said further temperature-responsive resistance means being connected in parallel relation to said voltage source.

* * * * *